United States Patent
Wallace et al.

(10) Patent No.: US 6,188,314 B1
(45) Date of Patent: Feb. 13, 2001

(54) ENERGY DISTRIBUTION AND COMMUNICATION SYSTEM AND METHOD UTILIZING A COMMUNICATION MESSAGE FRAME FOR A MULTI-DEVICE VEHICLE OCCUPANT PROTECTION SYSTEM

(75) Inventors: Jon Kelly Wallace, Redford; Russell J. Lynch, West Bloomfield; Roger A. McCurdy, Troy, all of MI (US)

(73) Assignee: TRW Inc., Lyndhurst, OH (US)

( * ) Notice: Under 35 U.S.C. 154(b), the term of this patent shall be extended for 0 days.

(21) Appl. No.: 09/243,598

(22) Filed: Feb. 3, 1999

(51) Int. Cl.$^7$ ...................................................... B60Q 1/00
(52) U.S. Cl. ............... 340/438; 340/310.01; 340/310.02; 307/38; 307/39
(58) Field of Search .............................. 340/438, 310.01, 340/310.02; 307/1, 38, 39

(56) References Cited

U.S. PATENT DOCUMENTS

| | | |
|---|---|---|
| 2,611,826 | 9/1952 | Kalfaian . |
| 3,144,609 | 8/1964 | Rumble . |
| 4,328,482 | 5/1982 | Belcher et al. . |
| 4,540,890 * | 9/1985 | Gangemi et al. ........................ 307/40 |
| 4,719,616 | 1/1988 | Akano . |
| 4,926,158 | 5/1990 | Zeigler . |
| 5,003,457 | 3/1991 | Ikei et al. . |
| 5,428,535 | 6/1995 | Katsumata et al. . |
| 5,436,897 | 7/1995 | Cook . |
| 5,473,635 | 12/1995 | Chevroulet . |
| 5,493,267 | 2/1996 | Ahlse et al. . |
| 5,499,269 | 3/1996 | Yoshino . |
| 5,623,518 | 4/1997 | Pfiffner . |
| 5,694,109 | 12/1997 | Nguyen et al. . |
| 5,760,489 * | 6/1998 | Davis et al. ........................ 307/10.1 |

OTHER PUBLICATIONS

A SAE publication entitled "Bus System for Wiring Actuators of Restraint Systems", by Bauer et al., and believed to have been published in 1996.

Co–pending U.S. Patent Application Serial No. 08/887,772, filed Jul. 3, 1997, entitled "A Communication System and Method Utilizing an Interface Protocol for a Multiple Device Vehicle Occupant Restraint System."

* cited by examiner

Primary Examiner—Julie Lieu
(74) Attorney, Agent, or Firm—Tarolli, Sundheim, Covell, Tummino & Szabo L.L.P.

(57) ABSTRACT

A system (10) conveys energy and communication between a master (16) and a plurality of slaves (18, 20), via a bus (14). A power/voltage transmitter (44) of the master (16) provides electrical energy, having a voltage, onto the bus (14) to power the slaves (18, 20). The power/voltage transmitter (44) adjusts voltage past a predetermined threshold to provide a message frame and modulating voltage during the message frame to convey messages to the slaves (18,20). Voltage receivers (58, 64), at each slave (18, 20), detect the voltage modulations to discern messages from the master (16) during the message frame. Current transmitters (56, 62), at each slave (18, 20), modulate current during the message frame to convey messages to the master (16). The current transmitters (18, 20) utilize the modulation of voltage of the electrical energy to clock modulation of current. A current receiver (48) of the master (16) detects current modulations to discern messages from the slaves (18, 20). Preferably, the system is part of an occupant protection system (12), and the slaves (18, 20) include an occupant protection device.

25 Claims, 6 Drawing Sheets

ENERGY DISTRIBUTION AND COMMUNICATION SYSTEM AND METHOD UTILIZING A COMMUNICATION MESSAGE FRAME FOR A MULTI-DEVICE VEHICLE OCCUPANT PROTECTION SYSTEM

TECHNICAL FIELD

The present invention is generally directed to an energy distribution and communication system and method of a vehicle occupant protection system.

BACKGROUND OF THE INVENTION

As the sophistication of vehicle occupant protection systems has increased, the number and complexity of vehicle occupant protection devices within the protection systems has increased. In response to the increased number of devices, there has been a movement toward centralized control of the devices within the protection systems to reduce cost and increase reliability. This change in the design approach for protection systems has brought about a need to design new arrangements for power distribution and data communication between a central controller and the devices.

SUMMARY OF THE INVENTION

In accordance with one aspect, the present invention provides an energy distribution and communication system between a central unit and a plurality of remote units. An electrical conductor interconnects the central unit and the remote unit for conducting electrical energy. Energy supply means provides electrical energy, which has a voltage, onto the conductor to power the remote units. Voltage messaging means, associated with the central unit, adjusts voltage of the electrical energy past a predetermined threshold to provide a message frame and modulates voltage of the electrical energy during the message frame to convey messages from the central unit to the remote units via the conductor. Voltage receiver means, at each remote unit, monitors the voltage of the electrical energy during the message frame and detects the voltage modulations to discern messages from the central unit. Current messaging means, at each remote unit, modulates current of the electrical energy during the message frame to convey messages to the central unit via the conductor. The current messaging means includes means for utilizing the modulation of voltage of the electric energy to clock current modulation. Current receiver means, associated with the central unit, detects current modulations to discern messages from the remote units.

In accordance with another aspect, the present invention provides an occupant protection system for protecting a vehicle occupant. An actuatable occupant protection device protects the vehicle occupant. A central unit controls actuation of the protection device and provides power for use by the protection device. The protection device is located remote from the central unit. An electrical conductor interconnects the central unit and the protection device for conducting electrical energy. The central unit includes energy supply means for providing electrical energy, having a voltage, onto the conductor. The central unit includes voltage messaging means for adjusting voltage of the electrical energy past a predetermined threshold to provide a message frame and for modulating voltage of the electrical energy during the message frame to convey messages from the central unit to the protection device via the conductor. The protection device includes voltage receiver means for monitoring the voltage of the electrical energy during the message frame and for detecting the voltage modulations to discern messages from the central unit. The protection device includes current messaging means for modulating current of the electrical energy during the message frame to convey messages to the central unit via the conductor. The current messaging means includes means for utilizing the modulation of voltage of the electric energy to clock current modulation. The central unit includes current receiver means for detecting current modulations to discern messages from the protection device.

In accordance with another aspect, the present invention provides a method of distributing energy and communicating between a central unit and a plurality of remote units. Electrical energy, having a voltage, is provided onto a conductor from the central unit to power the remote units. The voltage of the electrical energy is adjusted past a predetermined threshold to provide a message frame. The voltage of the electrical energy is modulated during the message frame to convey messages from the central unit to the remote units. The voltage modulations are detected at the remote units to discern messages from the central unit. Current is modulated during the message frame to convey messages from the remote units to the central unit. The current modulations are detected at the central unit to discern messages from the remote units. The step of modulating current includes utilizing the modulation of the voltage to clock current modulation.

BRIEF DESCRIPTION OF THE DRAWINGS

The foregoing and other features and advantages of the present invention will become apparent to one skilled in the art upon consideration of the following description of the invention and the accompanying drawings, in which.

DESCRIPTION OF PREFERRED EMBODIMENT

Figure 1:
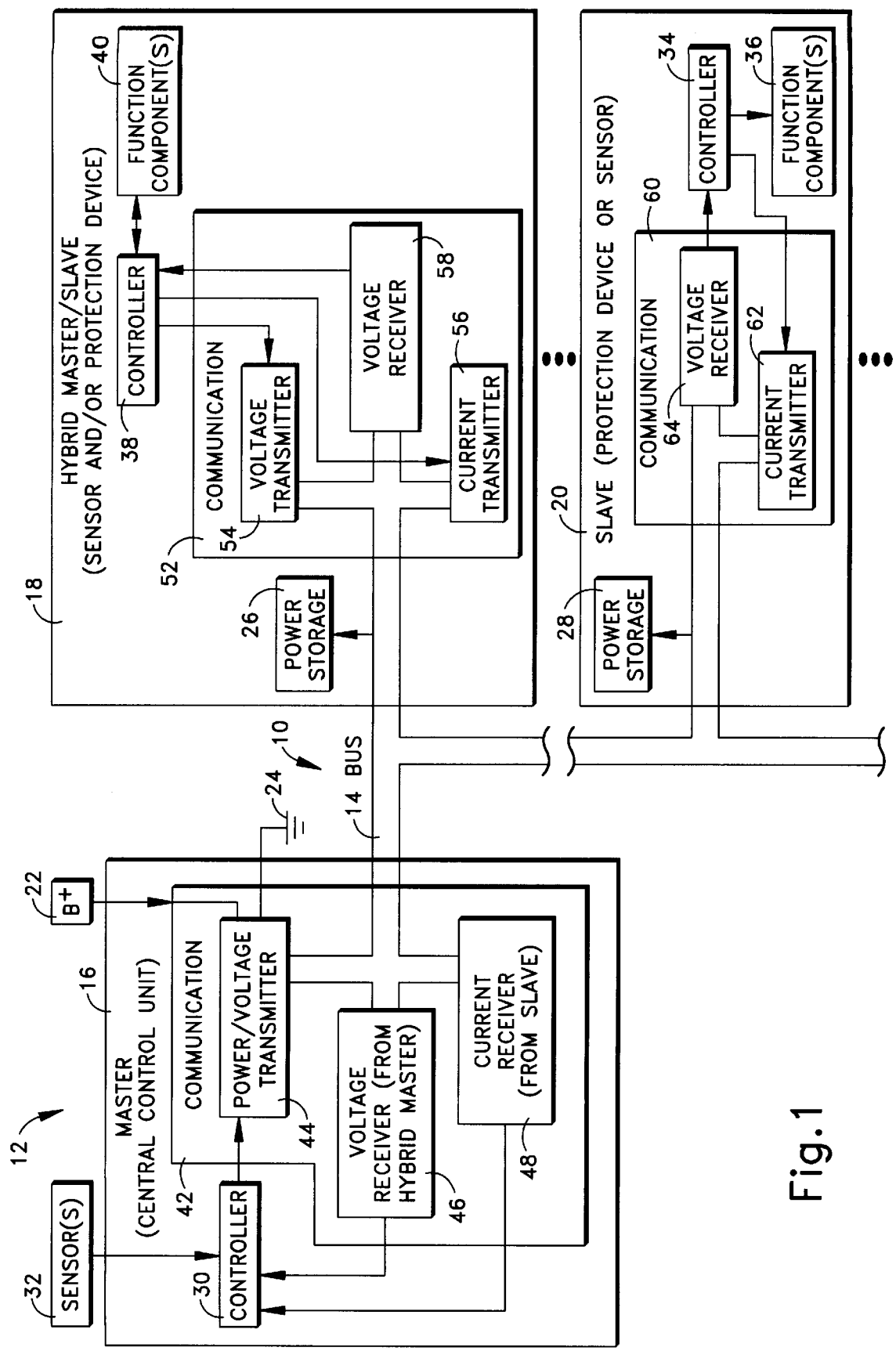
FIG. 1 is a block diagram of a vehicle occupant protection system having an energy distribution and communication system in accordance with the present invention.

One representation of the present invention is schematically shown in FIG. 1 as an energy distribution and communication system 10 for a vehicle occupant protection system 12. The occupant protection system 12 helps protect one or more vehicle occupant(s) in the event of a vehicle condition for which it is desired to protect the vehicle occupant(s). For example, the occupant protection system 12 helps protect the occupant(s) during a vehicle collision and during a vehicle rollover. Hereinafter, the occupant protection system 12 is referred to as the protection system 12, and the energy distribution and communication system 10 is referred to as the communication system 10, for brevity.

The protection system 12 is a distributed system, in that at least some of the components of the protection system are located remote from other components of the protection system. An energy transfer and communication bus 14 (hereinafter "the bus 14") of the communication system 10 interconnects the components of the protection system 12. The bus 14 includes at least one electrical conductor, such as a metal wire, along which electrical energy can flow to transfer electrical power and to convey messages. The components of the protection system 12 include a master device 16, one or more hybrid master/slave device(s) 18, and one or more slave device(s) 20. The designations of "master" and "slave" are directed to the aspect of which components (e.g., masters) provide commands within the protection system 12, and which components (e.g., slaves) are responsive to such commands.

The designations of "master" and "slave" also indicate how electrical energy is distributed within the protection system 12. Specifically, the master 16 supplies electrical energy to power the hybrid master/slave(s) 18, and the slave(s) 20. The master 16 is connected to a source 22 of electrical energy, such as a battery of the vehicle, through suitable power regulation means, and is also connected to electrical ground 24 of the vehicle. The hybrid master/slave (s) 18 and the slave(s) 20 are not directly connected to the source 22 of electrical energy. Each hybrid master/slave 18 includes a power storage component 26 that is connected to the bus 14 to receive energy via the bus for use within the hybrid master/slave. Each slave 20 includes a power storage component 28 that is connected to the bus 14 to receive energy via the bus for use within the slave.

Turning now to the details of the components of the protection system 12, the master 16 can be referred to as a central control unit. The master has a controller 30 with a processor, which executes a program (e.g., an algorithm), and/or with "hard-wired" circuitry to process information to make determinations for the protection system 12. Commands from the master 16 that are intended for other components (e.g., the slave(s)) of the protection system 12 are based upon the determinations made within the controller 30.

One function of the controller 30 is to process information indicative of vehicle operation and/or vehicle occupant characteristics to determine whether a need exists to provide protection to one or more vehicle occupants. The information indicative of vehicle operation and/or vehicle occupant characteristics is provided to the controller 30 via the communication system 10 and/or one or more sensor(s) 32 that are operatively connected to the controller. In one embodiment, the sensor(s) 32 include an acceleration sensor for detecting sudden vehicle deceleration such as would occur during a vehicle collision.

Another function of the controller 30 is to process information for diagnostic procedures within the protection system 12. The information needed for the diagnostic procedures is provided to the controller 30 via the communication system 10 via commands from the master 16 for diagnostic information from the other components.

Each slave 20 performs a commanded function within the protection system 12. Preferably, each slave 20 includes a controller 34 for handling messages and function component (s) 36 for performing commands conveyed via messages. It is to be appreciated that the controller 34 may merely be capable of recognizing addresses, responding to pre-defined messages, and issuing pre-defined messages. In other words, the controller 34 may be a "limited intelligence" component.

Preferably, at least one slave 20 is an actuatable occupant protection device. Each occupant protection device may be any suitable type of device. Examples of occupant protection devices include: an inflatable air bag device, an inflatable knee bolster device, an inflatable seat belt device, an inflatable headliner device, an inflatable side curtain device, a seat belt retractor lock device, a seat belt pretensioner device, and a D-ring height adjuster device.

It will be appreciated that upon the occurrence of a vehicle condition indicative of a situation in which a vehicle occupant is to be protected (e.g., a predetermined type of vehicle collision), the master 16 causes actuation of the occupant protection slave(s) 20 to help protect the occupant. In an example in which one slave 20 is an air bag module, the function components 40 include an air bag, a source of inflation fluid and a firing circuit. When actuated, the firing circuit causes the source of inflation fluid to inflate the air bag.

It is to be appreciated that some or all of the slave(s) 20 can be sensor devices. Further, such sensor slave(s) 20 could have "limited intelligence." An example of a sensor slave includes an accelerometer. Hereinafter, the slave(s) 20 are referred to as the slave 20 (singular) for simplicity, but with the understanding that plural slaves may be present.

The hybrid master/slave(s) 18 are responsive to commands from the master 16, but also provide commands to the slave 20. Preferably, each hybrid master/slave 18 includes a controller 38 for handling messages and function component (s) 40 for performing actions (e.g., command requests). It is to be appreciated that the controller 38 may merely be capable of recognizing addresses, responding to pre-defined messages, and issuing pre-defined messages. In other words, the controller 38 may be a "limited intelligence" component.

The hybrid master/slave(s) 18 may include a sensor device and/or may also include an actuatable occupant protection device. Moreover, the hybrid master/slave(s) 18 may include certain determination making components, whose determination is utilized elsewhere within the protection system 12. In addition, the hybrid master/slave(s) 18 may include actuatable components that provide indication of actuation and/or of the circumstances surrounding the actuation. Hereinafter, the hybrid master/slave(s) 18 are referred to as the hybrid master/slave 18 (singular) for simplicity, but with the understanding that plural hybrid master/slaves may be present.

In order for the master 16 to communicate and to supply power via the bus 14, the communication system 10 includes a communication portion 42 that is part of the master. A power/voltage transmitter 44 of the communication portion 42 is connected to the electrical source 22 and ground 24. The power/voltage transmitter 44 is also operatively connected to the controller 30 and to the bus 14. One function of the power/voltage transmitter 44 is to provide electrical energy onto the bus 14 as a supply of electrical energy for the hybrid master/slave 18 and the slave 20. A second function of the power/voltage transmitter 44 is to output voltage modulation signals onto the bus 14 to convey command messages from the master 16.

The communication portion 42 of the master 16 includes a voltage receiver 46 that is operatively connected to the controller 30 and to the bus 14. The voltage receiver 46 receives messages from the bus 14 that are conveyed via voltage modulation. Such voltage-modulation messages are placed onto the bus 14 by the hybrid master/slave 18.

The communication portion 42 of the master 16 also includes a current receiver 48 that is operatively connected to the controller 30 and to the bus 14. The current receiver 48 receives messages from the bus 14 that are conveyed via current modulation. Such current-modulation messages placed onto the bus 14 by the slave 20 or the hybrid master/slave 18. Thus, it is to be noted that the communication portion 42 of the master 16 sends messages via voltage modulation, receives messages via voltage modulation, and receives messages via current modulation.

In order for the hybrid master/slave 18 to communicate, the communication system 10 includes a communication portion 52 that is part of the hybrid master/slave. The communication portion 52 of the hybrid master/slave 18 includes a voltage transmitter 54 operatively connected to the controller 38 and to the bus 14. The voltage transmitter 54 modulates voltage on the bus 14 to send messages to the master 16 (or another hybrid master/slave).

A current transmitter 56 of the communication portion 52 is operatively connected to the controller 38 and to the bus 14. The current transmitter 56 modulates current on the bus 14 to send messages to the master 16. A voltage receiver 58 of the communication portion 52 is operatively connected to the controller 38 and to the bus 14. The voltage receiver 58 receives voltage-modulated signals on the bus 14. Such voltage-modulation messages are placed onto the bus 14 by the master 16 (or another hybrid master/slave 18). Thus, it is to be noted that the communication portion 52 of the hybrid master/slave 18 sends messages via voltage modulation, sends messages via current modulation, and receives messages via voltage modulation.

In order for the slave 20 to communicate, the communication system 10 includes a communication portion 60 that is part of the slave. A current transmitter 62 of the communication portion 60 is operatively connected to the controller 34 and to the bus 14. The current transmitter 62 modulates current on the bus 14 to send messages to the master 16 (or to a hybrid master/slave 18).

A voltage receiver 64 of the communication portion 60 is operatively connected to the controller 34 and to the bus 14. The voltage receiver 64 receives voltage-modulated signals on the bus 14. Such voltage-modulation messages are placed onto the bus 14 by the master 16 or the hybrid master/slave 18. Thus, it is to be noted that the communication portion 60 of the slave 20 sends messages via current modulation and receives messages via voltage modulation.

Figure 2:
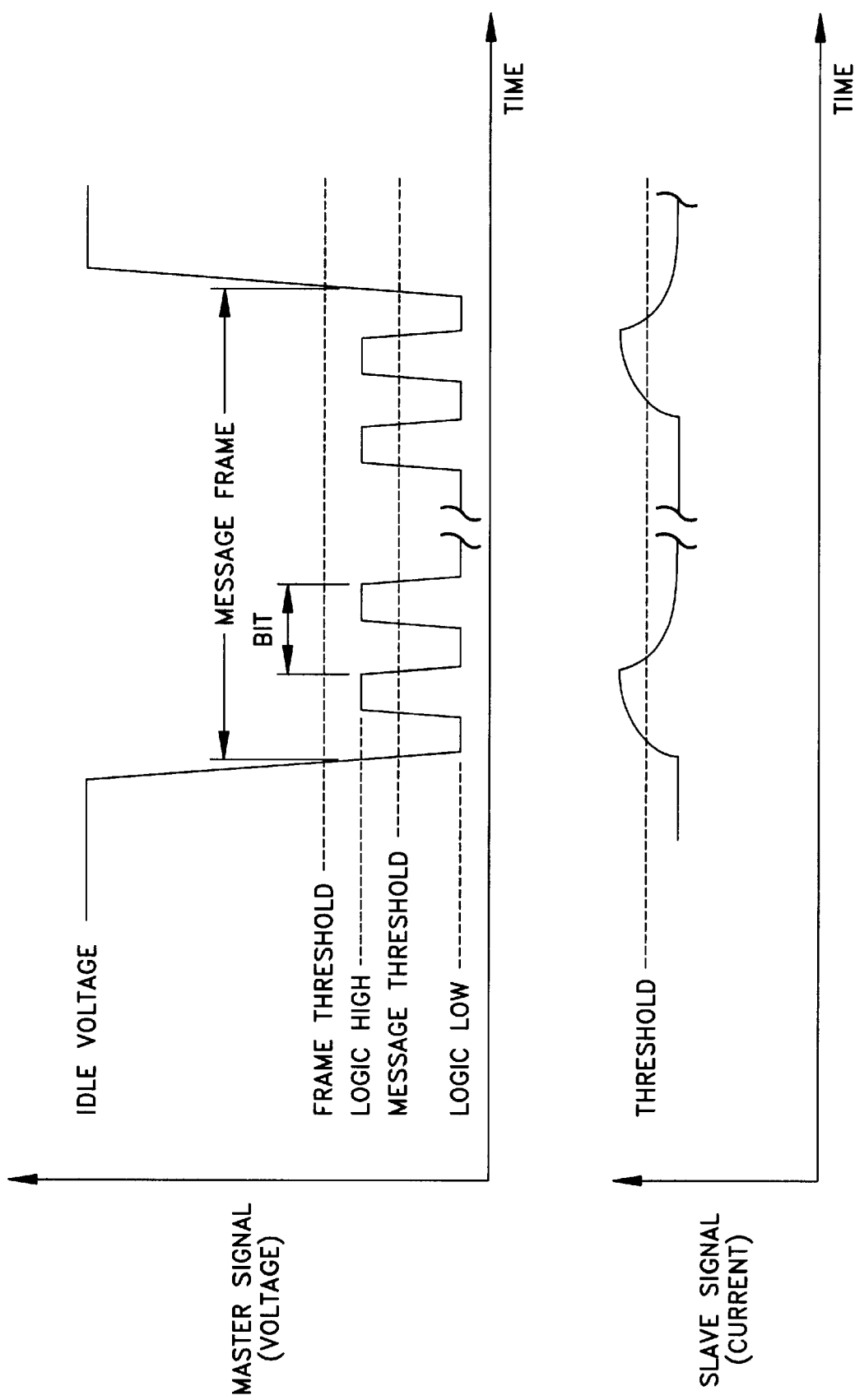
FIG. 2 is an illustration of plots showing a voltage mode message and a current mode message that occur simultaneously on a communication bus of the communication system of FIG. 1.

Turning now to the operation of the communication system 10, when communication is not happening (e.g., communication signals are not being transmitted along the bus 14) the communication system "idles." During idle, the power/voltage transmitter 44 of the master 16 provides electrical energy on the bus with a non-modulating voltage. The voltage of the electrical energy on the bus 14 during the idle period is referred to as an idle voltage. As shown in FIG. 2, the idle voltage is at a first predetermined level that is a relative high level. The power storage component 26 (FIG. 1) of the hybrid master/slave 18 and the power storage component 28 of the slave 20 accept and store electrical energy to power the components of the respective device.

Focusing on the communication periods (e.g., non-idle periods), the communication that occurs on the bus 14 can be full duplex or half duplex. Specifically, communication via voltage modulation (e.g., from the master 16 or the hybrid master/slave 18) and current modulation (e.g., from the slave 20 or the hybrid master/slave 18) can occur simultaneously. Preferably, communication via voltage modulation (e.g., from the master 16 or the hybrid master/slave 18) can occur without simultaneous current modulation communication.

The master 16 generally controls certain aspects with respect to the occurrence of a communication period on the bus 14. Specifically, in order for communication to occur on the bus, the master 16 provides a message frame (see FIG. 2). The message frame is a portion of time in which the voltage that is provided onto the bus 14 is reduced from the value of the idle voltage to a level below a frame threshold value.

During the message frame time period, the voltage is modulated (e.g., by the master 16 or the hybrid master/slave 18) between a first level (e.g., a lower level to represent logic LOW) and a second level (e.g., a higher level to represent logic HIGH). Both the logic LOW voltage value and logic HIGH voltage value are below the frame threshold value.

The voltage-modulated message comprises a series of bit segments. Within each bit segment, the voltage is modulated to provide a pulse at the logic HIGH voltage value. Each bit segment is defined to end on a falling edge of a pulse. The duration of the pulse at the logic HIGH voltage value has either a first duration or a second duration. The first pulse duration represents a binary zero, and the second pulse duration represents binary one. Thus, the voltage mode of communication is via pulse-width-modulation (PWM). Further, the voltage mode communication is serially transmitted and digital.

The drop of the voltage from the idle voltage value to begin the message window signals all the devices (e.g., the slave 20 and the hybrid master/slave 18) that receive voltage signals that the idle period has ended and that a message is about to be placed on the bus 14. Thus, minor voltage fluctuations about the idle voltage that may occur while the communication system 10 is in the idle mode are ignored by the components of the communication system. Such voltage fluctuation can occur via noise on the bus 14. The signal-to-noise ratio of the communication is higher because the components of the protection system 12 only participate in communication while the voltage is below the frame threshold value.

The master 16 (FIG. 1), or the hybrid master/slave 18, controls the length of the message frame. Thus, the number of bit segments is variable. Accordingly, the length of the messages is variable, and may be of any desired length. In other words, the message length may be changed for each message. Preferably, communication in the voltage mode is asynchronous in that the master 16 or hybrid master/slave 18 can transmit at will, regardless of whether current mode communication is occurring.

The master 16 controls the provision of the message frame. However, the hybrid master/slave 18 can cause the master 16 to provide a message frame such that the hybrid master/slave can transmit a voltage mode signal. It should be noted that the power/voltage transmitter 44 of the master 16 is current limited. Further, the voltage transmitter 54 of the hybrid master/slave 18 can pull down the voltage on the bus 14 (e.g., by shunting). The voltage receiver 46 of the master 16 senses the hybrid master/slave 18 pulling the voltage down and accordingly causes the voltage to drop, to provide the message frame for use by the hybrid master/slave (e.g., the master 16 lowers the current limit and the hybrid master/slave 18 controls the line voltage by changing shunt current).

Current signals are created via modulation of the amount of current on the bus 14 above/below a threshold value (see FIG. 2). For current mode messages from the hybrid master/slave 18, the current transmitter 56 varies the amount of current flowing on the bus 14. For current mode messages from the slave 20, the current transmitter 62 varies the amount of current flowing on the bus 14. Preferably, each of the current transmitters 56 and 62 includes a current sink device to vary the current draw. Preferably, current-mode communication only occurs during voltage-mode communication.

A sequence of data bit segments occurs during the current-mode communication, and each data bit has a binary value that is dependent upon the current draw value on the bus 14. Specifically, a first range of current draw values (e.g., below the threshold value) is indicative of logic LOW and a second range of current draw values (e.g., above the threshold value) is indicative of logic HIGH. For each data bit segment, a binary zero is represented by logic LOW at a predetermined point within the data bit segment. A binary one is represented by logic HIGH at the predetermined point with the data bit segment. Thus, the current mode communication is digital and serial.

As noted above, the current mode communication occurs simultaneously with the voltage mode communication. Thus, the current mode communication occurs during the message frame. The current transmitters 56 and 62 within the hybrid master/slave 18 and the slave 20, respectively, do not require an accurate internal clocking device to clock modulation of the current to provide the data bits of the current mode communication. Instead, the current transmitter relies upon the voltage data that is being simultaneously transmitted across the communications bus to clock the current modulation data. Specifically, current mode bit segments are defined by the falling voltage edges. The falling voltage edges occur at the beginning of the message frame (e.g., the fall from the idle voltage) and the falling edge of each pulse. Specifically, each current mode bit segment starts/ends when the voltage falls below a message threshold voltage value (FIG. 2). The use of the pulse width modulation of the voltage mode communication to clock the current mode communication results in automatic synchronization of the baud rate.

Each current transmitter 56/62 (of either the hybrid master/slave 18 or the slave 20) can change the data value being sent onto the bus 14 at each falling edge of the pulse width modulated voltage signal. At the current receiver 48 of the communication portion 42 of the master 16, the current value on the bus 14 is latched by the current receiver at each falling edge of the modulated voltage signal. Accordingly, the current receiver 48 latches the current draw value just as the power/voltage transmitter 44 is about to switch to end the voltage-mode communication bit.

As a further aspect of the current modulation communication, the provision of each sequence of current-mode communication bits is done via a non-return to zero format. Accordingly, when each current transmitter 56/62 (e.g., in the hybrid master/slave 18 or the slave 20), is sending a plurality of sequential data bits that are the same (e.g., two or more data bits that are all binary one), the current transmitter can maintain the current draw on the communications bus at the value indicative of the binary value without returning to a neutral value or a zero value. This has the benefit of speeding communications along the bus 14.

Figure 3:
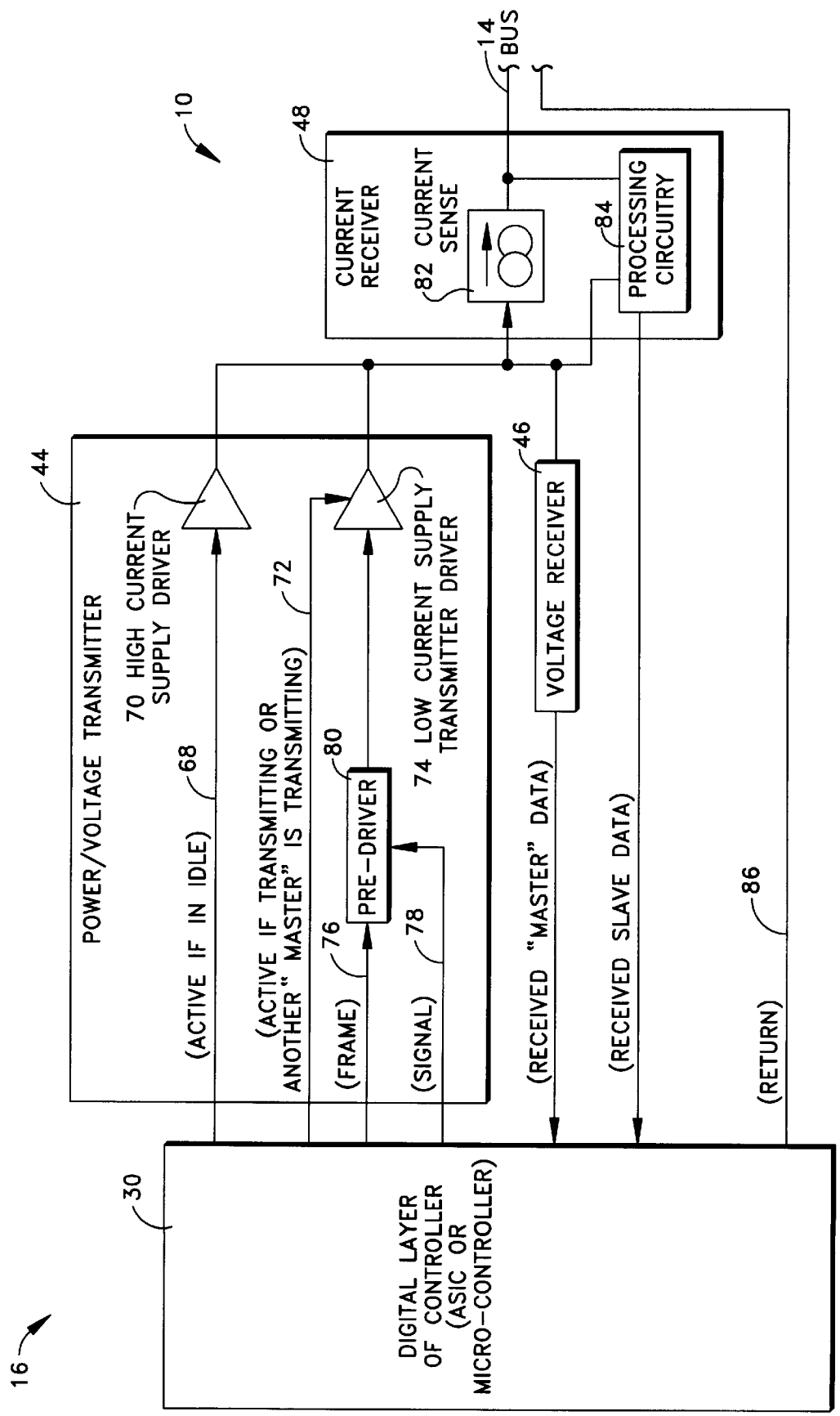
FIG. 3 is a block diagram showing details of a master device of the communication system of FIG. 1.

FIG. 3 illustrates an example of components within the master 16. Specifically, a digital layer of the controller 30 has a plurality of inputs and outputs. A first series of outputs is provided to the power/voltage transmitter 44.

A first output 68 is connected to a high current supply driver 70 of the power/voltage transmitter 44. Preferably, the high current supply driver 70 includes an amplifier. A signal provided on the first output 68 is active when the communication system 10 is idling. As will be recalled, electrical energy is provided at a predetermined idle voltage level during idle. Accordingly, the output of the high current supply driver 70 provides the idle voltage.

A second output 72 of the digital layer of the controller 30 is connected as a control to a low current supply transmitter driver 74 of the power/voltage transmitter 44. Preferably, the low current supply transmitter driver 74 includes an amplifier. A signal on the second output 72 is active when the master 16 or the hybrid master/slave 18 is transmitting a voltage mode signal. Thus, the low current supply transmitter driver 74 is only active or ON during voltage mode communication.

A third output 76 of the digital layer conveys a frame signal that sets the message threshold voltage level for the message frame. A fourth output 78 of the digital layer is a modulated signal that sets the logic low and logic high values for conveying the data bits. The third and fourth outputs are combined in a pre-driver circuit 80 and the output of the pre-driver circuit is provided as the input to the low current supply transmitter driver 74. Accordingly, the output provided by the low current supply transmitter driver 74 is dependent upon the combined values for the frame and pulse-width modulated data signal.

The voltage receiver 46 is connected to the bus 14 at the same node as the output of the high current supply driver 70 and the output of the lower current supply transmitter driver 74. The output of the voltage receiver 46 is provided as a first digital input to the digital layer of the controller 30. The voltage receiver 46 includes any suitable structure for detecting the voltage on the bus 14 and providing a digital output signal that is indicative of the modulated voltage signal that is present on the bus. In one embodiment, the voltage receiver 46 includes a plurality of comparators and filters.

A current sense component 82 of the current receiver 48 is located on the bus 14, and the two end nodes of the current sense component are connected to processing circuitry 84 of the current receiver. The processing circuitry 84 outputs a digital signal. The signal is a second input to the digital layer of the controller 30, and is indicative of the amount of current on the bus 14. Preferably, the processing circuitry 84 includes a comparator, an amplifier, and a filter. A return line 86 of the bus 14 is connected to the digital layer of the controller 30.

Figure 4:
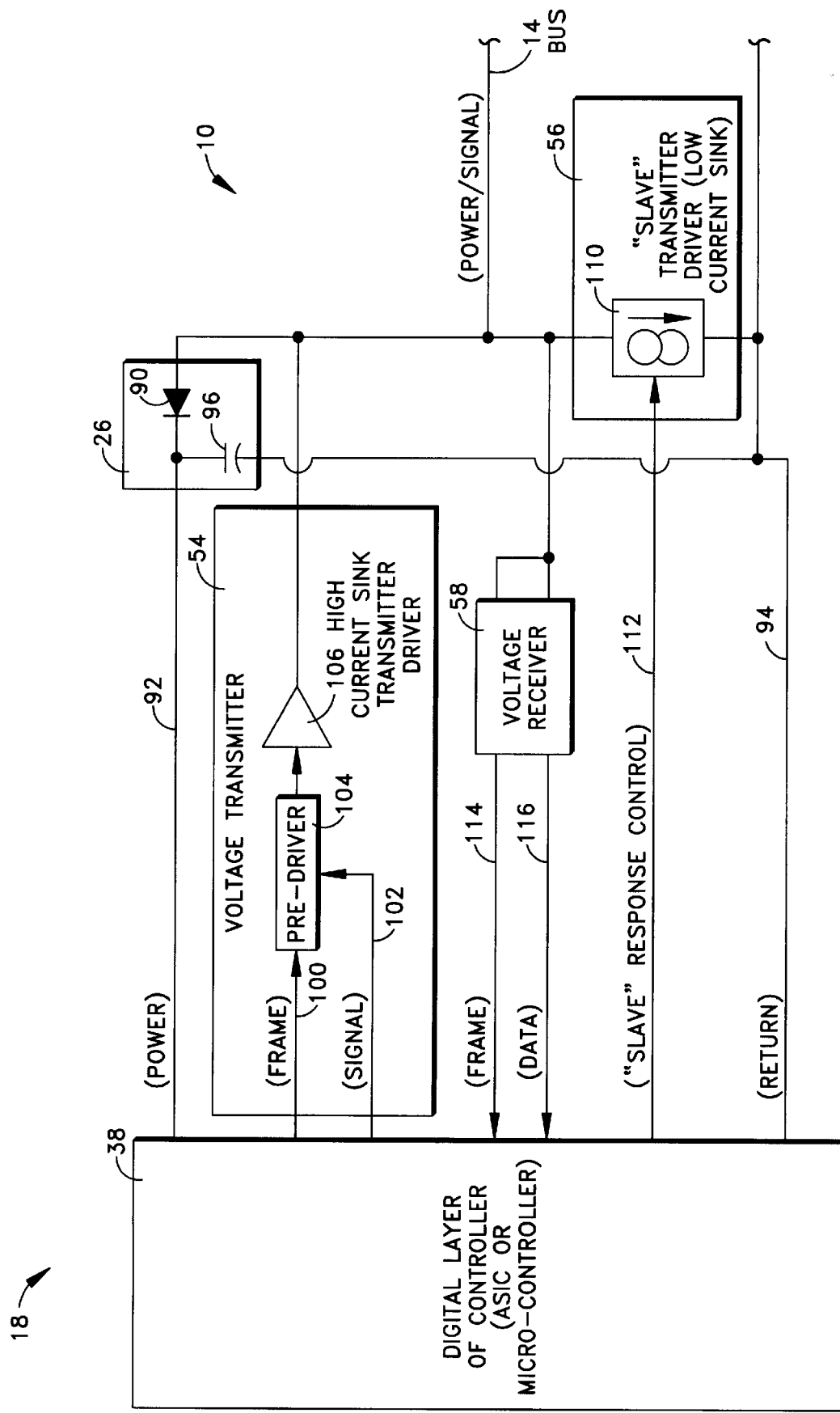
FIG. 4 is a block diagram showing details of a hybrid master/slave device of the communication system of FIG. 1.

FIG. 4 illustrates an example of components within the hybrid master/slave 18. A diode 90 is connected between a node on the bus 14 and a power line 92 that extends to a digital layer of the controller 38. A return line 94 is connected to the digital layer of the controller 38. A capacitor 96 is connected between the power line 92 and the return line 94. The diode 90 and the capacitor 96 form the energy storage component 26. When the communication system 10 is idling, the capacitor 96 is charged. The energy stored in the capacitor 96 is used to power hybrid master/slave 18 when the communication system 10 is engaged in communication. The diode 90 prevents energy from flowing back onto the bus 14.

The digital layer of the controller 38 has a plurality of inputs and outputs. A first series of outputs is provided to the voltage transmitter 54. A first output 100 of the digital layer conveys a frame signal. A second output 102 of the digital layer conveys a modulated signal that sets the logic low and logic high values for conveying the data bits. The first and second outputs are combined in a pre-driver circuit 104, and the output of the pre-driver circuit is provided as the input to a high current sink transmitter driver 106. Accordingly, the output provided by the high current sink transmitter driver 106 is dependent upon the combined values for the frame and pulse-width modulated data signal. Thus, the output of the voltage transmitter 54 is an indicator signal to the master 16 to lower the current limit for the lower voltage for the message frame, and a modulated voltage signal to convey the message. Specifically, the master changes the current limit. The hybrid master/slave 18 controls the line voltage by changing the sink current until the voltage reaches the desired state.

In the illustrated example, the current transmitter 56 includes a slave line driver low current sink 110, which is connected along the bus 14. A slave response control line 112 is connected between the digital layer of the controller 38 and the current sink 110. The current sink 110 varies the amount of current on the bus 14 and is controlled via a slave response control signal from the digital layer. The slave response control signal is modulated in a sequence to provide current draw indicative of logic low and logic high.

The voltage receiver 58 is connected to the bus 14 at the same node as the output of the high current sink transmitter driver 106. First and second output lines 114 and 116 from the voltage receiver 58 are connected to the digital layer of the controller 38. A digital signal that is indicative of the message frame is provided via the line 114 as a first input to digital layer of the controller 38. A digital signal that is indicative of the modulated data signal is provided via the second line 116 as a second input to the digital layer of the controller 38. The voltage receiver 58 includes any suitable structure for detecting voltage on the bus 14 and providing the digital output signals indicative of the message frame and the modulated voltage. In one embodiment, the voltage receiver 46 includes a plurality of comparators and filters.

With regard to the master 16 (FIG. 3) and the hybrid/master slave 18 (FIG. 4), the example diagrams indicate that the digital layer of the respective controller may include an ASIC or a micro-controller performing a preprogrammed process, and many of the components connected to digital layer inputs/outputs (e.g., the components are not incorporated within the digital layer ASIC). It is to be appreciated that the master 16 and/or the hybrid master/slave 18 may be configured such that all of the components are within a single ASIC.

Figure 5:
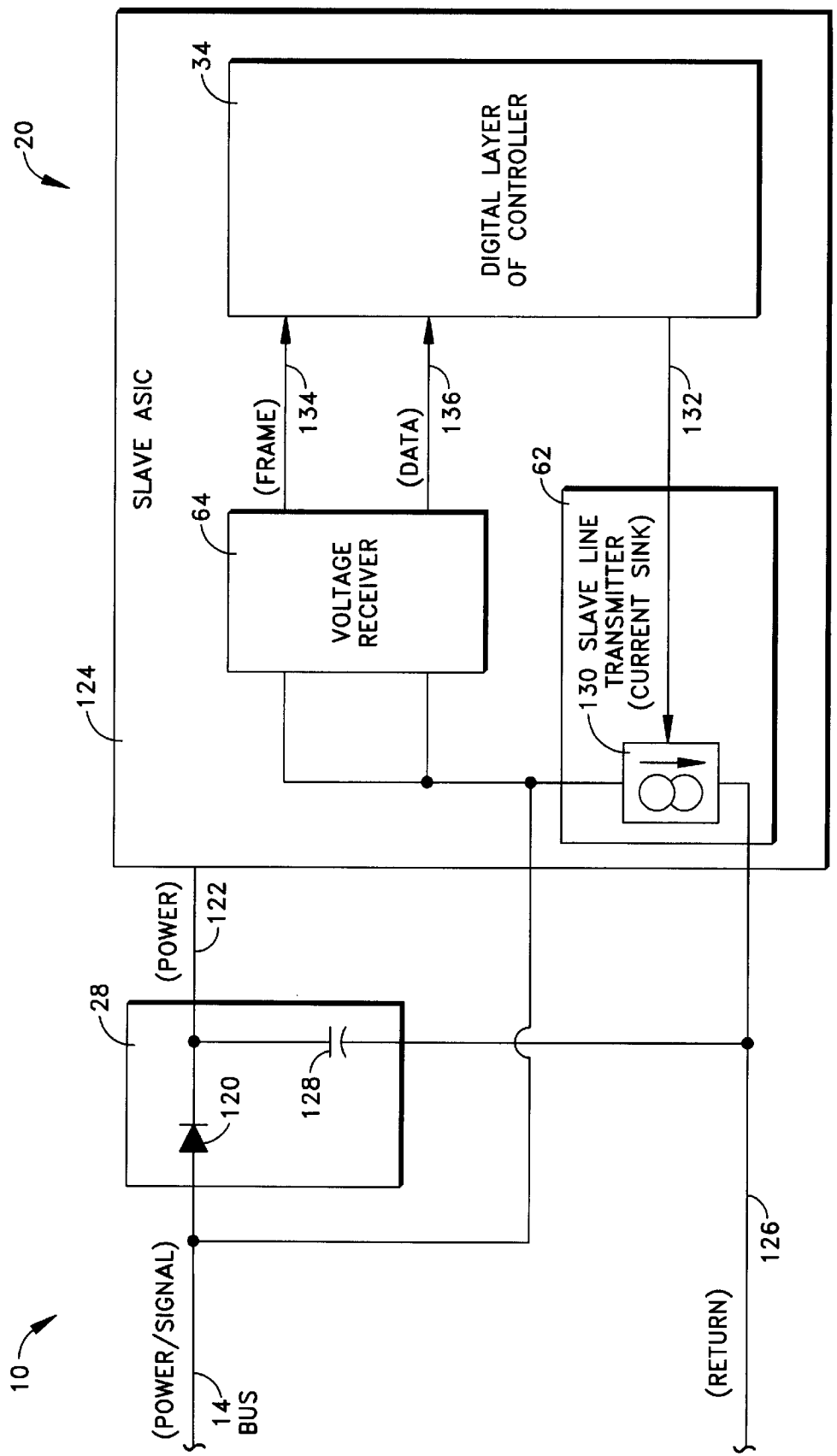
FIG. 5 is a block diagram showing details of a slave device of the communication system of FIG. 1.

FIG. 5 illustrates an example of components within the slave 20. A diode 120 is connected between a node on the bus and a power line 122 that extends to an ASIC 124 within the slave 20. A return line 126 is connected to the ASIC 124. A capacitor 128 is connected between the power line 122 and the return line 126. The diode 120 and the capacitor 128 form the power storage component 28. When the communication system 10 is idling, the capacitor 128 is charged. The energy stored in the capacitor 128 is used to power the slave 20 when the communication system 10 is engaged in communication. The diode 120 prevents energy from the capacitor 128 from flowing back onto the bus 14.

A digital layer of the controller 34 may be part of the ASIC 124 and has an output and two inputs. A slave line driver current sink 130 of the current transmitter 62 is connected along the bus 14. A slave response control line 132 is connected between the digital layer of the controller 34 and the current sink 130. The current sink 130 varies the amount of current on the bus 14 and is controlled via a slave response control signal from the digital layer. The slave response control signal is modulated in a sequence to provide current draw indicative of logic low and logic high.

The voltage receiver 64 is connected to the bus 14. A first output line 134 of the voltage receiver 64 is connected to the digital layer of the controller 34. The first output line 134 conveys a digital signal that is indicative of the presence of the message frame. A second output line 136 of the voltage receiver 64 is connected to the digital layer of the controller 34. The signal conveyed on the second output line 136 is a digital signal and is indicative of the modulated data signal. The voltage receiver 64 includes any suitable structure for detecting voltage on the bus 14 and providing the digital output signals indicative of the message frame and the modulated voltage. In one embodiment, the voltage receiver 64 includes a plurality of comparators and filters.

It should be noted that in the illustrated example, the slave ASIC 124 contains the voltage receiver 64, the current transmitter 62, and the digital layer of the controller 34. It is to be appreciated that the ASIC 124 may be designed to only include the digital layer, with the voltage receiver 64 and current transmitter 62 located outside of the ASIC.

Figure 6:
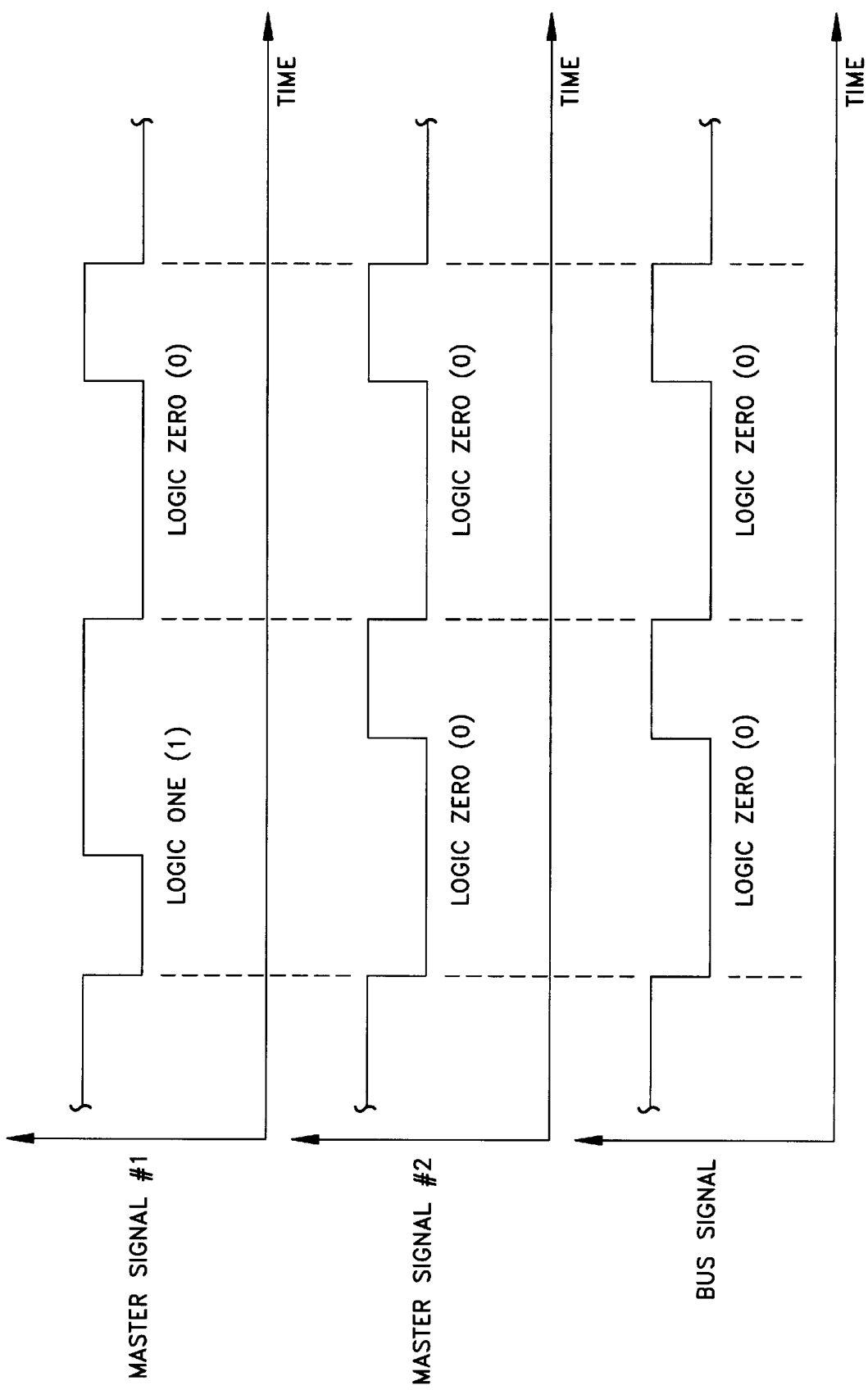
FIG. 6 is a plot illustrating an arbitration arrangement for voltage signals that occur simultaneously on the communication bus of the communication system of FIG. 1.

The present invention provides various additional aspects. For example, a zero dominant voltage based arbitration scheme can be used on the bus 14. Specifically, it is possible that the master 16 and the hybrid master/slave 18 may attempt to communicate via a voltage-modulated signal at the same time. On the bus, any binary logic one that occurs simultaneously with a binary logic zero will be interpreted to be binary logic zero. This scheme is shown in FIG. 6.

The master 16 and the hybrid master/slave 18 each monitor their own message. When the master 16 is transmitting and a bit does not match, the master immediately ceases transmission of its message. Similarly, when the hybrid master/slave 18 is transmitting and a bit does not match, the hybrid master/slave immediately ceases transmission of its message. This allows for non-destructive arbitration. No messages are lost. For example, if a first device (e.g., the master 16) was sending an address 0001 and a second device (e.g., the hybrid master/slave 18) was sending an address 0011, the message on the bus would be 0001 (e.g., the third bit of the message from the second device would drop to 0). The second device would recognize that its third bit did not match and would immediately cease transmission. The first device would complete its message without disruption. Other types of arbitration (e.g., non-address arbitration) can be used.

Also, it is to be appreciated that the master 16 is the overall master of all of the other devices including the hybrid master/slave 18. If the hybrid master/slave 18 is transmitting a voltage signal at a time when the master 16 wishes to transmit a high priority voltage based message, the master causes the hybrid master/slave to cease transmission. Specifically, the master 16 stops a voltage-based message from the hybrid master/slave 18 by pulling the voltage on the bus 14 to ground. In response, the hybrid master/slave 18 ceases modulation of the voltage on the bus 14.

Also, it is contemplated that slave current response arbitration may be included in the system. Also, it is contemplated that the only current mode response transmitted is from the previously addressed slave/hybrid master.

From the above description of the invention, those skilled in the art will perceive improvements, changes and modifications. For example, the communication system need not have slaves (e.g., only master/slaves) or need not have master/slave (e.g., only slaves). Also, the system could have multiple communication buses extending from the master. Each of the multiple buses could connect slaves only, master/slaves only, or a combination of slaves and master/ slaves. Such improvements, changes and modifications within the skill of the art are intended to be covered by the appended claims.

Having described the invention, the following is claimed:

1. An energy distribution and communication system between a central unit and a plurality of remote units, said system comprising:

an electrical conductor interconnecting the central unit and the remote units for conducting electrical energy;

energy supply means for providing electrical energy, having a voltage, onto said conductor to power the remote units;

voltage messaging means, associated with the central unit, including means for adjusting voltage of the electrical energy past a predetermined threshold to provide a message frame and means for modulating voltage of the electrical energy during the message frame to convey messages from the central unit to the remote units via said conductor;

voltage receiver means, at each remote unit, including means for monitoring the voltage of the electrical energy during the message frame and means for detecting the voltage modulations to discern messages from the central unit;

current messaging means, at each remote unit, for modulating current of the electrical energy during the message frame to convey messages to the central unit via said conductor, including means for utilizing the modulation of voltage of the electrical energy to clock current modulation; and current receiver means, associated with the central unit, for detecting current modulations to discern messages from the remote units.

2. A system as set forth in claim 1, wherein said current messaging means includes means for utilizing the modulation of voltage of the electrical energy to synchronize modulation of the current with modulation of voltage.

3. A system as set forth in claim 1, wherein said current receiver means includes means for latching a current value upon the occurrence of a predetermined voltage value change during voltage modulation.

4. A system as set forth in claim 1, wherein said current messaging means includes means for shifting to a different current value upon the occurrence of a predetermined voltage value change during voltage modulation.

5. A system as set forth in claim 1, wherein said current messaging means includes means for modulating current via a non-return to zero format.

6. A system as set forth in claim 1, wherein said means for adjusting voltage, of said voltage messaging means, includes means for adjusting voltage of the electrical energy below a predetermined voltage value to provide the message frame.

7. A system as set forth in claim 1, wherein said means for modulating, of said voltage messaging means, includes means for providing a first voltage level to represent a first logic value and for providing a second voltage level to represent a second logic value.

8. A system as set forth in claim 7, wherein said means for modulating, of said voltage messaging means, includes means for providing a first duration digital value and for providing a second duration pulse at the first voltage to represent a second digital value.

9. A system as set forth in claim 1, including remote voltage messaging means, at some of the remote units, for modulating voltage of the electrical energy during the message frame to convey messages from some of the remote units via said conductor.

10. A system as set forth in claim 9, including master voltage receiver means, at the central unit, including means for monitoring voltage of the electrical energy and means for detecting voltage modulations to discern messages from some of the remote units.

11. A system as set forth in claim 9, wherein said remote voltage messaging means includes means for requesting the central unit to provide the message frame.

12. A system as set forth in claim 9, including means, at the central unit, for stopping said remote voltage messaging means from modulating voltage.

13. A system as set forth in claim 9, including means, at the central unit, for determining if a difference exists between the message from the central unit and the message on said conductor, and means, at the central unit, for stopping said voltage messaging means in response to a determined difference.

14. A system as set forth in claim 13, including means, at each of said some of the remote units, for determining if a difference exists between the message from the respective remote unit and the message on said conductor, and means, at each of said some of the remote units, for stopping said remote voltage messaging means in response to a determined difference.

15. A system as set forth in claim 1, wherein said means for adjusting voltage, of said voltage messaging means, includes means for providing the message frame for any length of time, and said means for modulating voltage, of said voltage messaging means, includes means for providing messages of duration dependent upon duration of the message frame.

16. A system as set forth in claim 1, wherein the remote units do not require accurate clocking mechanisms.

17. A system as set forth in claim 1, wherein the remote units include at least one actuatable occupant protection device for protection of a vehicle occupant, the central unit controls actuation of the protection device.

18. A system as set forth in claim 17, wherein the protection device is an airbag device.

19. A system as set forth in claim 1, wherein remote units include at least one sensor device.

20. An occupant protection system for protecting a vehicle occupant, said system comprising:

an actuatable occupant protection device for protecting the vehicle occupant;

a central unit for controlling actuation of said protection device and for providing power for use by said protection device, said protection device being located remote from said central unit; and an electrical conductor interconnecting said central unit and said protection device for conducting electrical energy;

said central unit including energy supply means for providing electrical energy, having a voltage, onto said conductor;

said central unit including voltage messaging means for adjusting voltage of the electrical energy past a predetermined threshold to provide a message frame and for modulating voltage of the electrical energy during the message frame to convey messages from said central unit to said protection device via said conductor;

said protection device including voltage receiver means for monitoring the voltage of the electrical energy during the message frame and for detecting the voltage modulations to discern messages from said central unit;

said protection device including current messaging means for modulating current of the electrical energy during the message frame to convey messages to the central unit via said conductor, including means for utilizing the modulation of voltage of the electrical energy to clock current modulation; and said central unit including current receiver means for detecting current modulations to discern messages from the protection device.

21. A method of distributing energy and communicating between a central unit and a plurality of remote units, said method comprising:

providing electrical energy, having a voltage, onto a conductor from the central unit to power the remote units;

adjusting the voltage of the electrical energy past a predetermined threshold to provide a message frame;

modulating voltage of the electrical energy during the message frame to convey messages from the central unit to the remote units;

detecting the voltage modulations at the remote units to discern messages from the central unit;

modulating current during the message frame to convey messages from the remote units to the central unit; and detecting the current modulations at the central unit to discern messages from the remote units;

wherein said step of modulating current includes utilizing the modulation of voltage of the electrical energy to clock modulation of current.

22. A method as set forth in claim 21, wherein said step of modulating current includes utilizing the modulation of voltage of the electrical energy to synchronize modulation of the current with modulation of voltage.

23. A method as set forth in claim 22, wherein said step of detecting the current modulations includes latching a current value upon the occurrence of a predetermined voltage value change during voltage modulation.

24. A method as set forth in claim 21, wherein said step of modulating current includes shifting to a different current value upon the occurrence of a predetermined voltage value change during voltage modulation.

25. An energy distribution and communication system between a central unit and a plurality of remote units, said system comprising:

an electrical conductor interconnecting the central unit and the remote units for conducting electrical energy;

energy supply means for providing electrical energy, having a voltage, onto said conductor to power the remote units;

voltage messaging means, associated with the central unit, including means for adjusting voltage of the electrical energy to remain past a predetermined threshold to provide a message frame and means for modulating voltage of the electrical energy, without the voltage of the electrical energy proceeding past the threshold, during the message frame to convey messages from the central unit to the remote units via said conductor;

voltage receiver means, at each remote unit, including means for monitoring the voltage of the electrical energy during the message frame and means for detecting the voltage modulations to discern messages from the central unit;

current messaging means, at each remote unit, for modulating current of the electrical energy during the message frame, and concurrent with the modulation of voltage of the electrical energy, to convey messages to the central unit via said conductor, including means for utilizing the modulation of voltage of the electrical energy to clock current modulation; and current receiver means, associated with the central unit, for detecting current modulations to discern messages from the remote units.

* * * * *

UNITED STATES PATENT AND TRADEMARK OFFICE
CERTIFICATE OF CORRECTION

PATENT NO. : 6,188,314 B1
DATED : February 13, 2001
INVENTOR(S) : Jon Kelly Wallace et al.

It is certified that error appears in the above-identified patent and that said Letters Patent is hereby corrected as shown below:

Column 11,
Line 60, after "duration", insert -- pulse at the first voltage level to represent a first --.

Signed and Sealed this

Twentieth Day of August, 2002

Attest:

Attesting Officer

JAMES E. ROGAN
Director of the United States Patent and Trademark Office